(12) United States Patent
Singh et al.

(10) Patent No.: US 10,783,300 B1
(45) Date of Patent: Sep. 22, 2020

(54) SYSTEMS AND METHODS FOR EXTRACTING HIERARCHICAL PATH EXCEPTION TIMING MODELS

(71) Applicant: Cadence Design Systems, Inc., San Jose, CA (US)

(72) Inventors: Sushobhit Singh, Noida (IN); Naresh Kumar, Greater Noida (IN); Beenish, Noida (IN); Ankur Gulati, Haryana (IN); Vishal Karda, Greater Noida (IN); Shashank Prasad, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/218,678

(22) Filed: Dec. 13, 2018

(51) Int. Cl.
*G06F 30/3312* (2020.01)
*G06F 30/33* (2020.01)
*G06F 30/3315* (2020.01)
*G06F 119/12* (2020.01)

(52) U.S. Cl.
CPC .......... *G06F 30/3312* (2020.01); *G06F 30/33* (2020.01); *G06F 30/3315* (2020.01); *G06F 2119/12* (2020.01)

(58) Field of Classification Search
CPC .. G06F 17/504; G06F 17/505; G06F 17/5022; G06F 17/5031; G06F 17/5045; G06F 30/20; G06F 30/33; G06F 30/3312; G06F 30/3315; G06F 2217/84
USPC .................................. 816/102–103, 108, 113
See application file for complete search history.

(56) References Cited

U.S. PATENT DOCUMENTS

| | | | |
|---|---|---|---|
| 2005/0198601 A1* | 9/2005 | Kuang | G06F 17/5022 716/108 |
| 2013/0144872 A1* | 6/2013 | Gupta | G06F 16/334 707/728 |
| 2013/0205269 A1* | 8/2013 | Griesbach | G06F 17/505 716/102 |
| 2013/0339912 A1* | 12/2013 | Rao | G06F 17/5045 716/102 |
| 2014/0019427 A1* | 1/2014 | Wan | G06F 16/22 707/694 |
| 2014/0059505 A1* | 2/2014 | Blair | G06F 17/5045 716/108 |
| 2018/0024848 A1* | 1/2018 | Dmytryshyn | G06F 17/2836 704/2 |

* cited by examiner

*Primary Examiner* — Paul Dinh
(74) *Attorney, Agent, or Firm* — Mark H. Whittenberger, Esq.; Holland & Knight LLP

(57) ABSTRACT

The present disclosure relates to a system for performing static timing analysis in an electronic design. Embodiments may include providing, using at least one processor, an electronic design and extracting hierarchical crossing path exception information from a hierarchical design view associated with the electronic design. Embodiments may further include transferring the hierarchical crossing path exception information to a block view associated with the electronic design and extracting a timing model based upon, at least in part, the hierarchical crossing path exception information. Embodiments may also include implementing the timing model at a top-level view associated with the electronic design.

16 Claims, 15 Drawing Sheets

US 10,783,300 B1

SYSTEMS AND METHODS FOR EXTRACTING HIERARCHICAL PATH EXCEPTION TIMING MODELS

FIELD OF THE INVENTION

The embodiments of the invention generally relate to design methods for static timing analysis of integrated circuit designs.

BACKGROUND

EDA utilizes software tools that may be used in the design and analysis of numerous electronic systems such as printed circuit boards (PCBs) and integrated circuits (ICs). Some EDA tools utilize static timing analysis (STA) as a method to assess the timing of any given digital circuit using software techniques and certain models that provide relevant characteristics of the digital circuit.

Extracted Timing Models (ETMs) are popular hierarchical static timing analysis tool used for hierarchical implementation and signoff. ETM is an interface timing model of a block, which can be plugged in to the top-level netlist for a rapid top-level timing analysis. The worst timing path for each path group, other than the register-register internal paths, may be enumerated by performing the timing analysis. Each worst-case timing path may be characterized for a range of input conditions.

The extracted timing models lead to pessimistic timing results when they are analyzed at the top level for implementation. This leads to unnecessary overwork by optimization engines and leads to larger closure cycles. One of the major causes of pessimism in top level implementations using extracted timing models is the inability to model hierarchy crossing path exceptions.

SUMMARY

In one or more embodiments of the present disclosure, a computer-implemented method for performing static timing analysis in an electronic design is provided. The method may include providing, using at least one processor, an electronic design and extracting hierarchical crossing path exception information from a hierarchical design view associated with the electronic design. The method may further include transferring the hierarchical crossing path exception information to a block view associated with the electronic design and extracting a timing model based upon, at least in part, the hierarchical crossing path exception information. The method may also include implementing the timing model at a top-level view associated with the electronic design.

One or more of the following features may be included. In some embodiments, the method may include generating one or more top-level timing constraints based upon, at least in part, the hierarchical crossing path exception information. The method may include generating one or more block-level timing constraints, based upon, at least in part, the top-level timing constraints. The hierarchical crossing path exception information may include at least one crossing path exception that is initially visible at the hierarchical design view but not an initial top-level view. The timing model may include at least one of a check arc, a zero delay combination arc, and a sequential arc. The timing model may be based upon, at least in part, a hierarchical context translator. The hierarchical context translator may include at least one of port information, internal pin information, and through list information.

In one or more embodiments of the present disclosure a computer-readable storage medium having stored thereon instructions, which when executed by a processor result in one or more operations is provided. Operations may include providing, using at least one processor, an electronic design and extracting hierarchical crossing path exception information from a hierarchical design view associated with the electronic design. Operations may further include extracting a hierarchical context translator including port information and internal pin information from the hierarchical design view associated with the electronic design and transferring the hierarchical crossing path exception information to a block view associated with the electronic design. Operations may also include extracting a timing model based upon, at least in part, the hierarchical crossing path exception information and the hierarchical context translator. Operations may further include implementing the timing model at a top-level view associated with the electronic design, wherein the timing model includes one or more additional arcs for modelling at least one missing hierarchical boundary crossing exception associated with the hierarchical crossing path exception information.

One or more of the following features may be included. Operations may further include generating one or more top-level timing constraints based upon, at least in part, the hierarchical crossing path exception information. Operations may also include generating one or more block-level timing constraints, based upon, at least in part, the top-level timing constraints. The hierarchical crossing path exception information may include at least one crossing path exception that is initially visible at the hierarchical design view but not an initial top-level view. The timing model may include at least one of a check arc, a zero delay combination arc, and a sequential arc. The hierarchical context translator may include through list information. Operations may also include storing the hierarchical context translator and reusing the hierarchical context translator during a second simulation.

In one or more embodiments of the present disclosure, a system for performing static timing analysis in an electronic design is provided. The system may include one or more processors configured to provide an electronic design and to extract hierarchical crossing path exception information from a hierarchical design view associated with the electronic design. The one or more processors may be further configured to transfer the hierarchical crossing path exception information to a block view associated with the electronic design. The one or more processors may be further configured to extract a timing model without user intervention based upon, at least in part, the hierarchical crossing path exception information. The one or more processors may be further configured to implement the timing model at a top-level view associated with the electronic design, wherein the timing model includes one or more additional arcs for modelling at least one missing hierarchical boundary crossing exception associated with the hierarchical crossing path exception information.

One or more of the following features may be included. In some embodiments, the one or more processors may be further configured to extract a hierarchical context translator including port information and internal pin information from the hierarchical design view associated with the electronic design. The timing model may include at least one of a check arc, a zero delay combination arc, and a sequential arc. The hierarchical context translator may include at least one of port information, internal pin information, and through list information. The one or more processors may be configured to store the hierarchical context translator and reuse the hierarchical context translator during a second simulation.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The present invention is illustrated by way of example, and not limitation, in the figures of the accompanying drawings in which like references indicate similar elements and in which.

DETAILED DESCRIPTION

Figure 1:
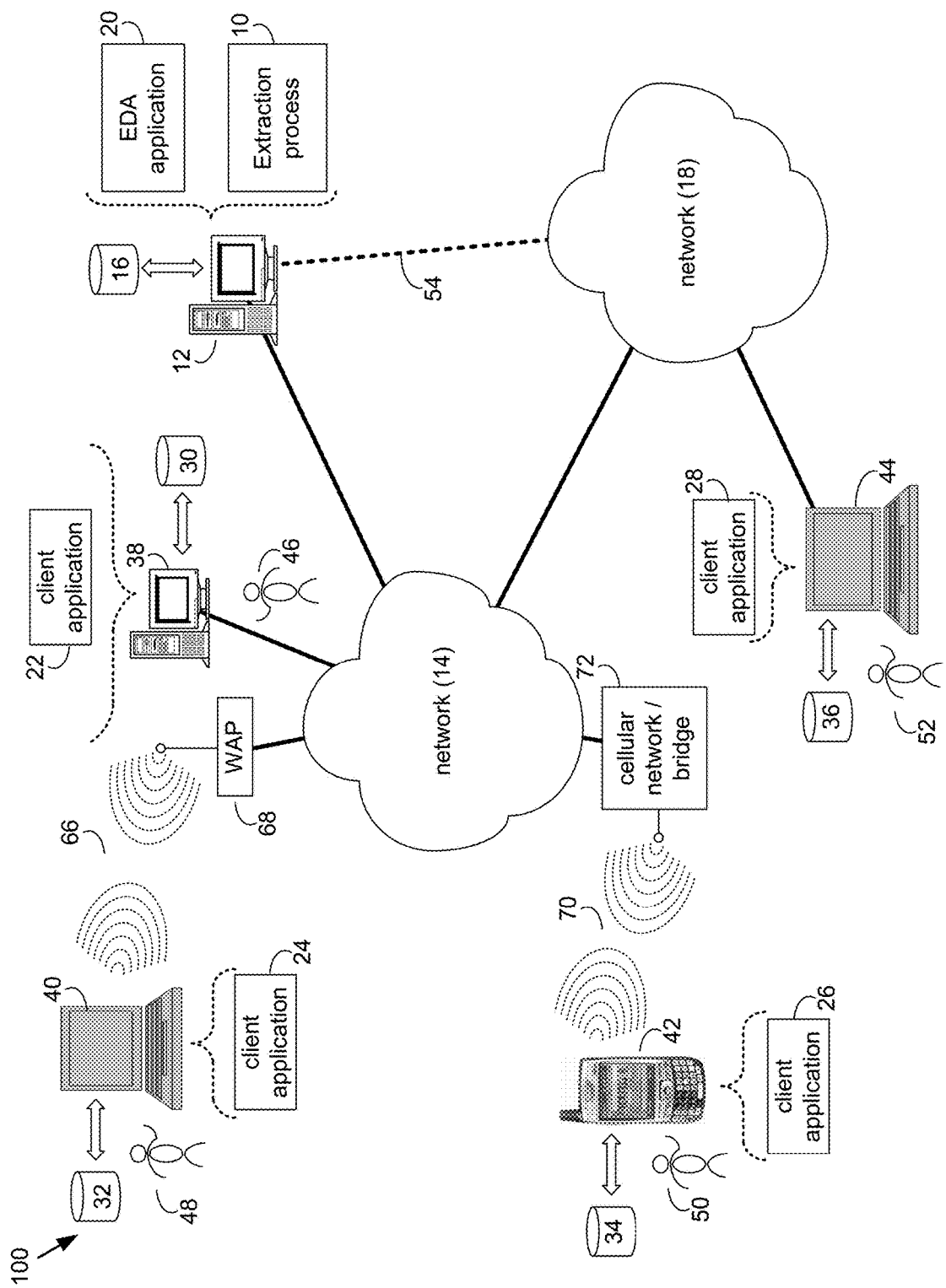
FIG. 1 illustrates a block diagram of an exemplary system showing an extraction process in accordance with embodiments of the present disclosure.

As used herein, the phrase "timing model" or "timing graph" may refer to a collection of arcs and checks which represents the timing behavior of a logic design. An "arc", as used herein, may refer to a path between pins or nodes of a timing graph that illustrates a signal can pass arrival time and slew from the input pin/node to the output (considering polarity) and/or may represent delay/slew of logic blocks or wires between pins of logic blocks. The phrase "static timing" may refer to an exhaustive method of measuring a design's timing robustness by building a timing graph of the design, providing signal arrival times, propagating these and identifying critical paths. The phrase "timing elements" may refer to logical context defining arcs and checks among three points in a timing graph. Some of these may include, but are not limited to, latches, flip flops, clock gates, etc.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosure. Some hardware description languages may include, but are not limited to, Verilog, VHDL, SystemC, SystemVerilog and Verilog-AMS. Various other hardware description languages may also be used as well.

Referring to FIG. 1, there is shown an extraction process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, extraction process 10 may reside on and be executed, in whole or in part, by a client electronic device, such as a personal computer, notebook computer, personal digital assistant, or the like.

The instruction sets and subroutines of extraction process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Web server is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Extraction process 10 may be a stand alone application, or may be an applet/application/script that may interact with and/or be executed within EDA application 20. In addition/as an alternative to being a server-side process, extraction process 10 may be a client-side process (not shown) that may reside on a client electronic device (described below) and may interact with an EDA client application (e.g., one or more of EDA client applications 22, 24, 26, 28). Further, extraction process 10 may be a hybrid server-side/client-side process that may interact with EDA application 20 and an EDA client application (e.g., one or more of client applications 22, 24, 26, 28). As such, extraction process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize extraction process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both).

Figure 2:
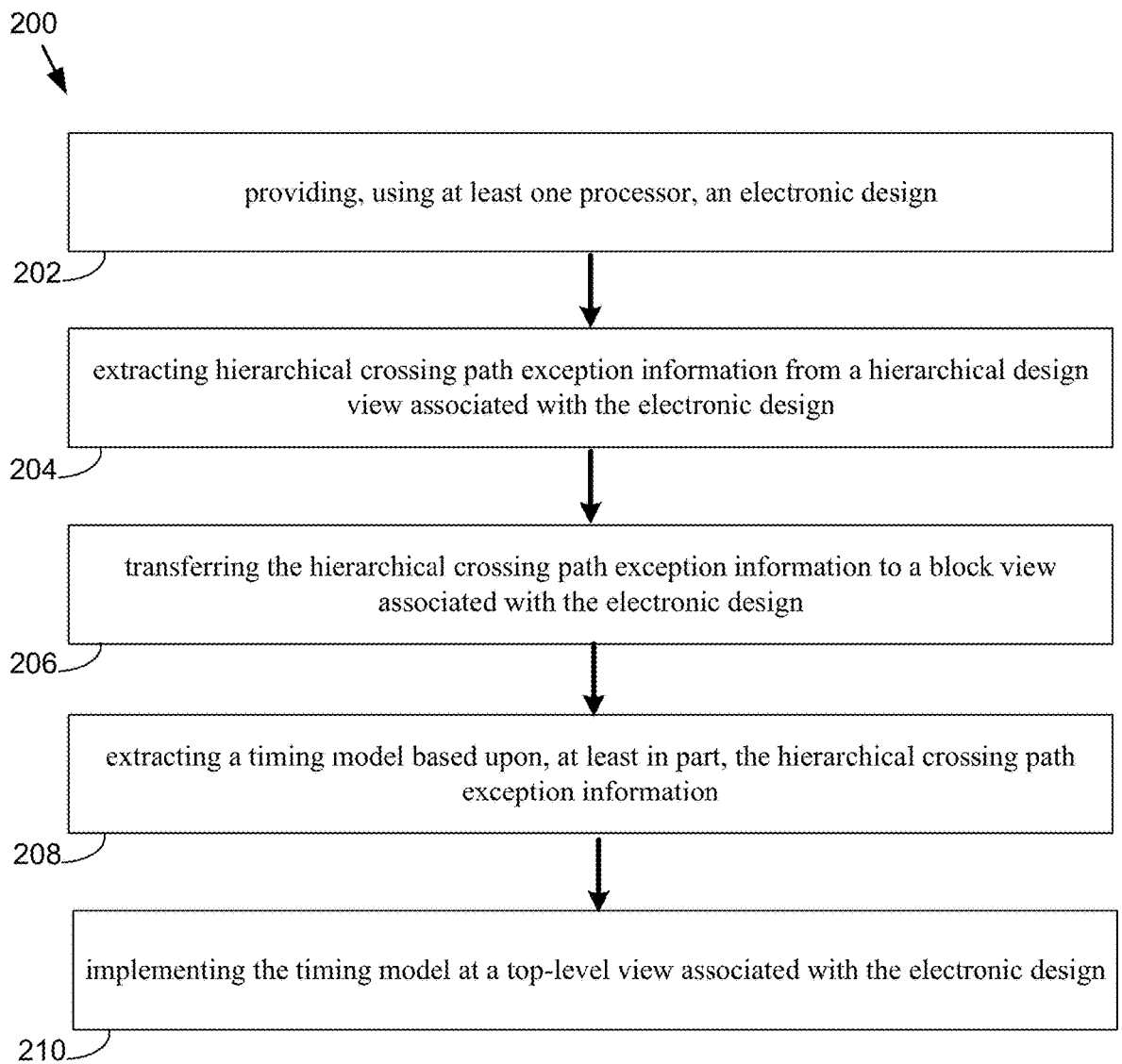
FIG. 2 illustrates a flowchart showing operations consistent with embodiments of the present disclosure.

Referring now to FIG. 2, an exemplary flowchart 200 depicting operations consistent with extraction process 10 is provided. The method may include providing (202), using at least one processor, an electronic design and extracting (204) hierarchical crossing path exception information from a hierarchical design view associated with the electronic design. Embodiments may further include transferring (206) the hierarchical crossing path exception information to a block view associated with the electronic design and extracting (208) a timing model based upon, at least in part, the hierarchical crossing path exception information. Embodiments may also include implementing (210) the timing model at a top-level view associated with the electronic design.

ETMs are hierarchical static timing analysis tools used for hierarchical implementation and signoff. An ETM is an interface timing model of a block, which may be plugged in to the top-level netlist for rapid top-level timing. Various types of arcs may be characterized in the extracted timing model. Some arc types may include, but are not limited to, timing check arcs, sequential arcs, combinational arcs, etc.

In some embodiments, a timing check arc may refer to one or more timing arcs in the extracted timing model which may be used to model the timing checks at the end point of a timing path. Some timing check arcs may include, but are not limited to, setup, hold, recovery removal, no change, data to data, clock style checks (clock period and pulse width), etc. A "Setup Arc" may model the setup time requirement of a sequential timing end point. A "Hold Arc" may model the hold time requirement of a sequential timing end point. A "Recovery Arc" may be used to model the asynchronous recovery timing check for a timing end point. A "Removal Arc" may be used to model the asynchronous removal check for a timing end point. A "No change Arc" may assert the requirement of no change in a signal for a given time window. A "Data to Data" check may be used to model the timing check requirements between two data signals. A "Clock Style Check" such as "Clock Period", which may be used to model the clock period assertion on a sequential cell clock pin and "Pulse width", which may be used to model the minimum pulse width requirement at a sequential cell clock pin may also be employed.

In some embodiments, a sequential arc may refer to timing arcs in the model which are used to model the trigger of a signal with respect to a clock or control signal from a sequential timing start point. A combinational arc may refer to one or more timing arcs in the timing model which may be used for modelling the delay of a purely combinational path in the design.

In some embodiments, extraction process 10 may utilize arc characterization reporting for reporting the characterization information. The arc characterization report may report a number of different types of data for characterizing boundary conditions on arc source and sink pins. Some types of data may include, but are not limited to, data segment delays, clock segment delays, timing check values, characterization adjustments, characterization values and math, etc. The phrase "data segment delay" may refer to the cumulative delay for all elements on the data segment of the path used for characterization. This may not contain the boundary delays applied on the start of the timing path. This information may be used in the timing reporting but not in the arc characterization reporting. The phrase "clock segment delay" may refer to the cumulative delays of all elements on the clock path segment. It may not contain the boundary information, and only the point to point delay is used. The phrase "timing check value" may refer to wherever applicable (check arcs) the timing check value based on the propagated transition times on the data and clock segments. The phrase "characterization adjustment" may refer to quantities, like uncertainty, common path pessimism removal ("CPPR"), advanced on-chip variation ("AOCV") adjustments, etc. that cannot be modeled through timing arc are adjusted in the characterization value. The phrase "characterization value and math" may refer to a characterization value which may be written out in the timing model using above data.

Figure 3:
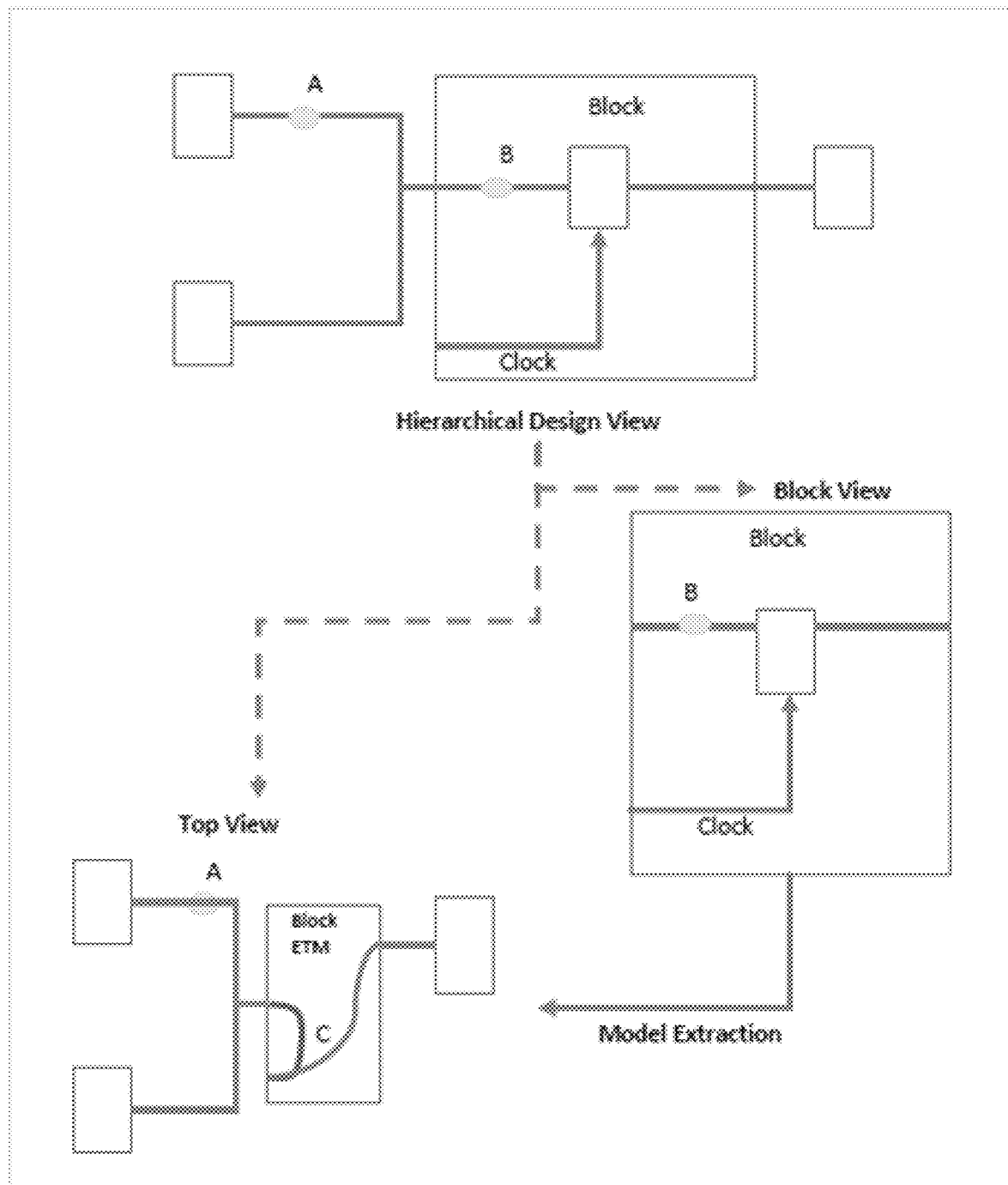
FIG. 3 illustrates a schematic showing hierarchy crossing multicycle path exception and top and block views consistent with embodiments of the present disclosure.

Referring now to FIG. 3, a schematic of a hierarchical design showing top and block views is provided. This example shows a multicycle path exception going through point A and B and can be defined as Multicycle Path-through A-through B. For a hierarchical implementation of the design this design may be partitioned into a block view and top view. The block view consists of the design within the hierarchical block, while the top view consists of the top-level logic and extracted timing model.

In some embodiments, from the block level view, model extraction may be performed, and this model may be integrated into the top-level view for top level implementation. Model extraction may be configured to analyze the most critical interface timing path and extract the interface arcs by timing characterization of this path. In FIG. 3, for example, timing check arc 'c' may be characterized using the most critical timing slack at the end-point of the interface path in the block view.

As shown in FIG. 3, the top level may lose the view of the exception which was there earlier. Moreover, the timing matches that of the most critical path and, in this example, the most critical path through point A is lost. This leads to false pessimism at the top level. When analyzing the path going through point A the optimization engine may interpret this as a single cycle path and may unnecessarily work on optimizing this path. This may result in wasted resources on chip, and longer time to achieve closure of the top level. There are other hierarchy crossing exceptions at the top level which may be lost, in the absence of the full design view at the model extraction state, and model extraction at the block level. This may be a problem when the block is stitched back at the top level, as the view of hierarchical exceptions is completely lost.

In some embodiments, extraction process 10 may be configured to generate one or more hierarchical path exception context aware extracted timing models ("HPEC-ETM"). Embodiments included herein are directed towards a hierarchical boundary crossing exception aware model extraction technique as is discussed in further detail hereinbelow.

In some embodiments, extraction process 10 may include extracting and transferring, hierarchy crossing path exception information from a hierarchical design view to the block view. This may include identifying and processing the hierarchy crossing exceptions for the block under consideration. This may also include converting them into a format understood by model extraction. This information may then act as the guidance for model extraction. Extracting and/or transferring hierarchy crossing path exception information may also include generating the block level boundary constraints, from the top-level constraints, which may decide timing analysis at the block level. Extracting and/or transferring hierarchy crossing path exception information may also include generating top level constraints, which may be used for the timing analysis at the top level with the extracted timing model. It should be noted that top level constraints and path exception information must be coherent.

In some embodiments, extraction process 10 may include extracting one or more timing models in the presence of the path exception information and boundary timing constraints generated above. The extraction process 10 may also include a top implementation run in the presence of exception aware extracted timing model and top-level constraints. In this example, we are referring to an automated exception aware timing model generation from the top level. The process may include a top level hierarchical STA run, where the top HPEC-ETM context may be generated and the same the hierarchical exception aware timing model extraction may be performed, without user intervention. Further, the same HETM context (hierarchical path exception crossing information) can be used for the subsequent HPEC-ETM generation runs at the block level, where the top level STA is not required. Once the path exception processing is done as described above, it is not needed again, and subsequent model extraction runs may use the same hierarchical crossing exception information.

In some embodiments, extraction process 10 may include a hierarchical context translator. The hierarchical context translator may include an information sharing model that conveys the hierarchical exception information to the block level. The hierarchical context or constraint translator along with the hierarchical block level constraints constitutes the hierarchical exception context.

In some embodiments, as the model extraction is performed on the block level, the view of the top-level exceptions is not present. Accordingly, embodiments included herein include a translational information sharing model, which may be used to pass on the relevant information to the model extractor working at the block level. This translational/handshake information sharing model is called hierarchical context translator (HCT). Table 1 shows a representative model.

TABLE 1

| HCT Path Exception Information Sharing Model | | |
| --- | --- | --- |
| Part | Internal Pin | Through List |
| P1 | INT_0 | (B) |
| P2 | INT_1 | (C) (D) |

In some embodiments, the HCT may be generated at the full hierarchical design view, where the hierarchy crossing information is available. Once HCT extraction is performed, the same can be taken to the model extraction flow at the block level. The model extractor may process the HCT and generate a timing model, containing additional arcs for modeling the missing hierarchical boundary crossing exceptions. The model coupled with top level SDC sufficiently covers all the crossing exceptions.

Figure 4:
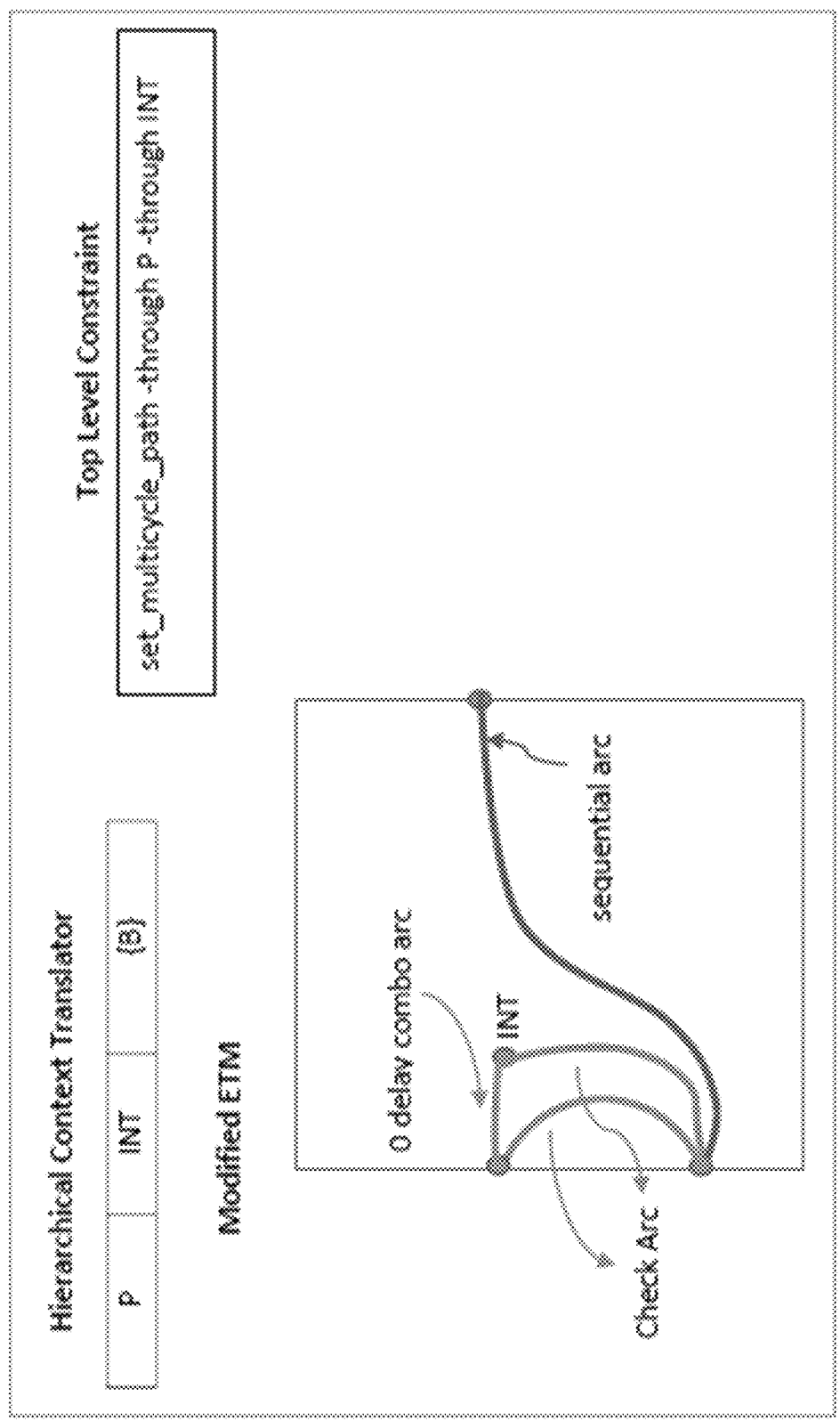
FIG. 4 illustrates a schematic showing a modified extracted timing model in the presence of the hierarchical translation and top level constraints consistent with embodiments of the present disclosure.

Referring now to FIG. 4, a schematic describing the hierarchical context translator and correspondingly modified ETM for the block described in FIG. 3 is provided. The ETM along with a top level SDC may model the requisite most critical path constraint, while keeping the original non-most critical timing path on the top level, intact.

In some embodiments, model extraction may generate a check arc by picking up the worst paths amongst the single cycle paths and placing the check arc between the clock and data pin. As described in the translator, the worst path of the multi-cycle paths may be used for extracting the check arc which may be applied between the INT pin and the clock pin and this is connected with a 0-delay arc as shown in FIG. 4.

Figure 5:
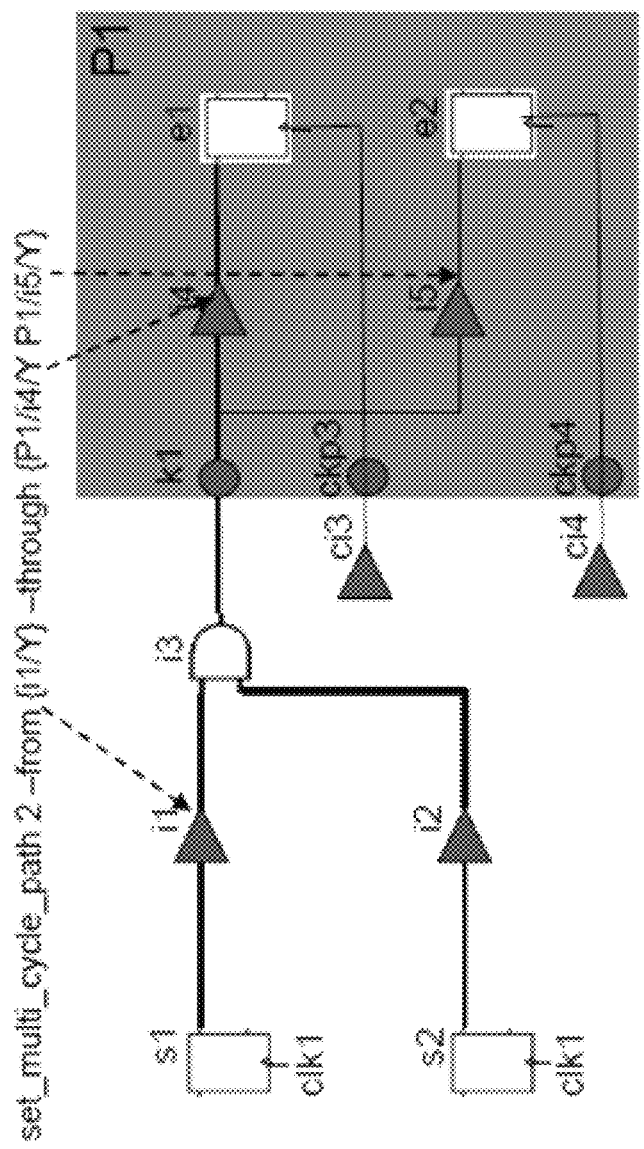
FIG. 5 illustrates a schematic showing an example chip design consistent with embodiments of the present disclosure.
Figure 6:
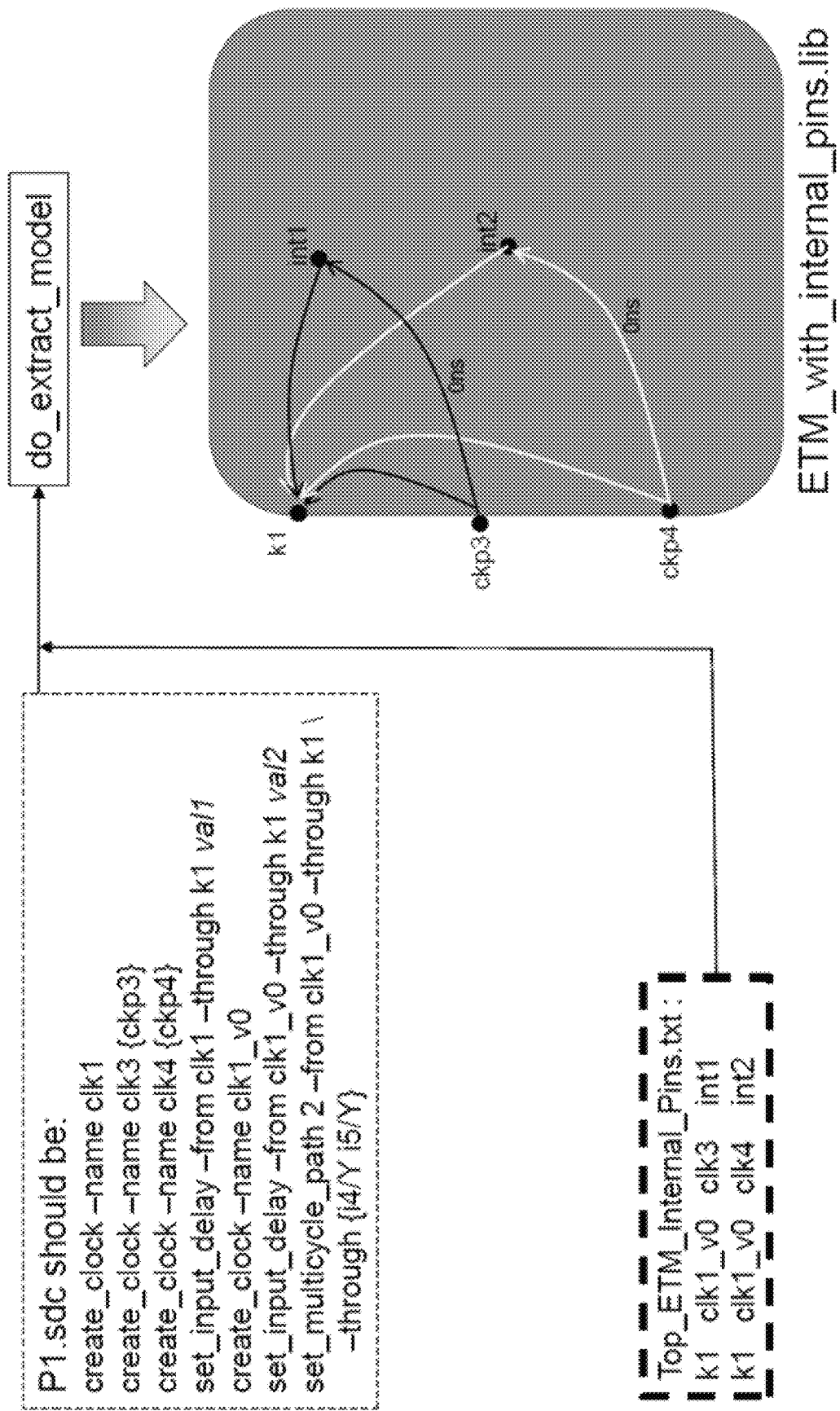
FIG. 6 illustrates a schematic showing an HPEC model for the example chip design of FIG. 5 consistent with embodiments of the present disclosure.

Referring now to FIGS. 5-6, an example chip design and corresponding HPEC model are provided. FIGS. 5-6 show an example of a multicyle path exception crossing a hierarchical boundary. This is leading to an additional timing arc which is referenced with the internal pin specified in the HCT (Hierarchical context Translator). The resultant model consists of the original ETM check arc and the path exception crossing based check arc. As shown in FIG. 5, a multicycle path exception may be applied on some part of the cone on the top level and inside the block. The HPEC model for this example is shown in FIG. 6 and contains internal pins to address both of the check arcs. One of the check arcs may be created from ckp3 while the other with ckp4 in the original ETM, and based on the HCT, may be created with the passed internal pins.

Figure 7:
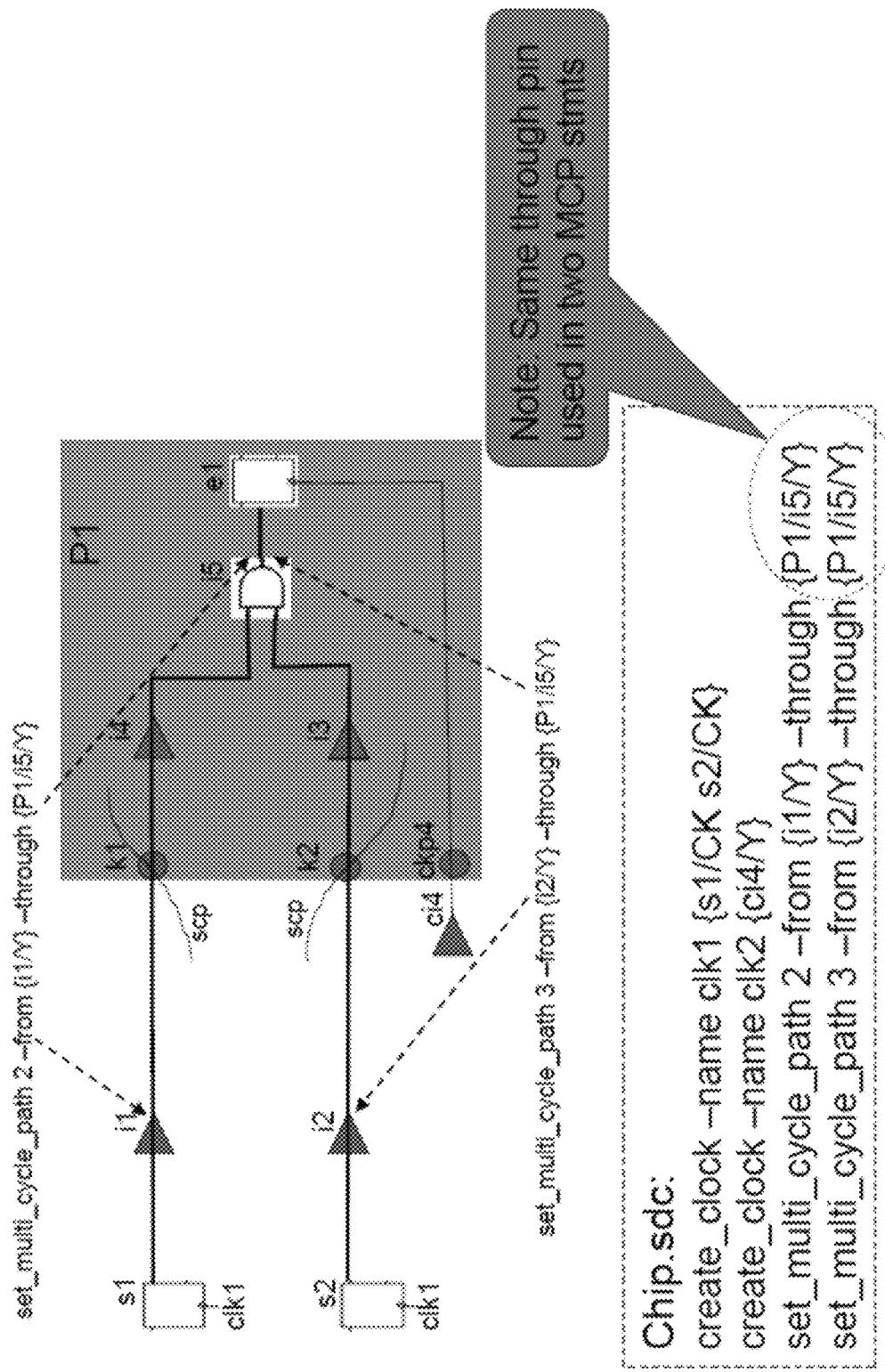
FIG. 7 illustrates a schematic showing another example chip design consistent with embodiments of the present disclosure.
Figure 8:
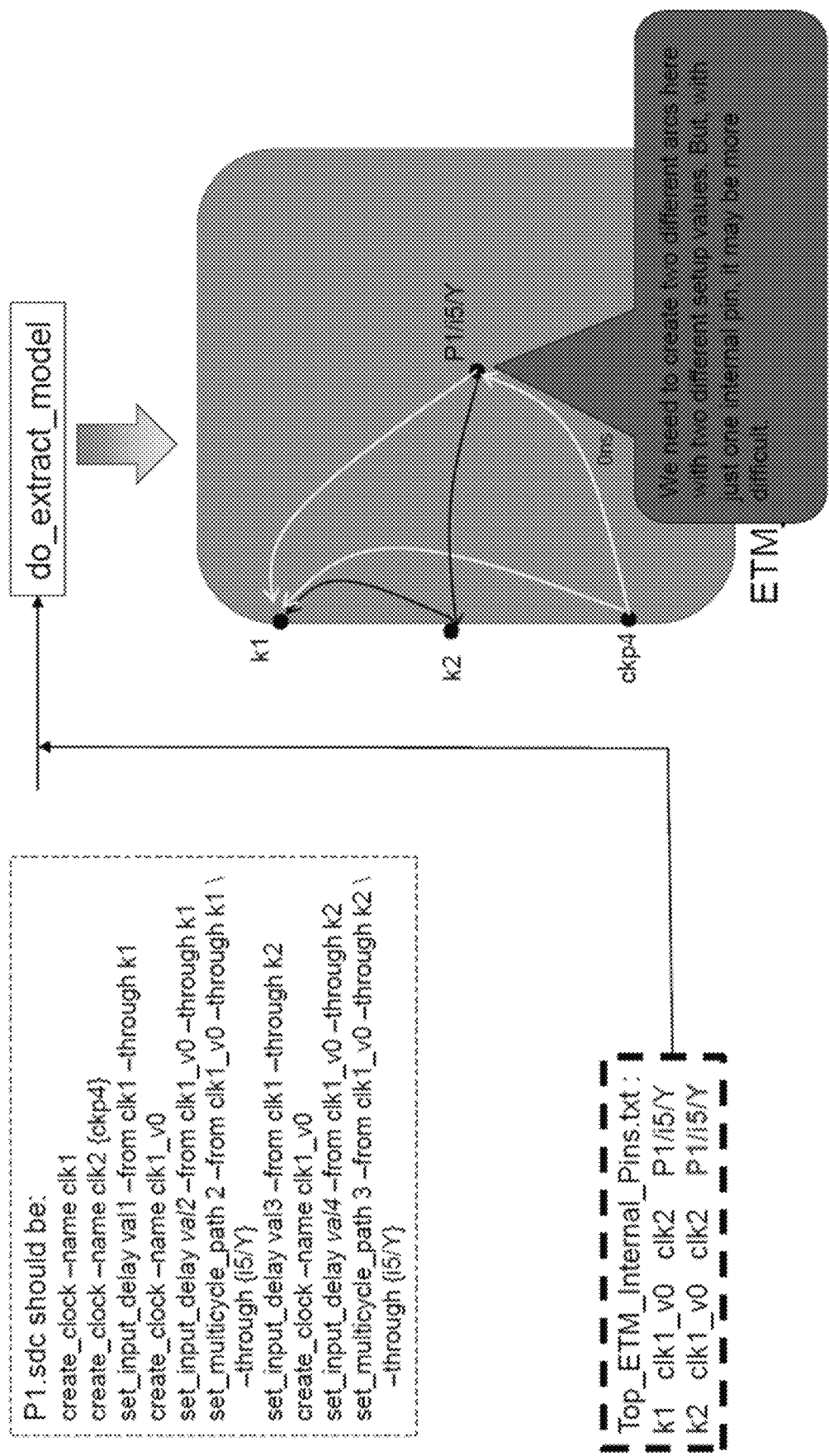
FIG. 8 illustrates a schematic showing an HPEC model for the example chip design of FIG. 7 consistent with embodiments of the present disclosure.

Referring now to FIGS. 7-8, an example chip design and corresponding HPEC model are provided. As shown in FIG. 7, if the same through pin is used in the two different constraints and the HCT contains the same internal pin reference it may be difficult to accurately model. The goal in this example is to illustrate why the "through" pin name can not be used as the name of the internal pin name, in the handshake file. FIG. 8 describes the HCT modeling for multiple path exceptions sharing the same pin (using a check arc example).

Figure 9:
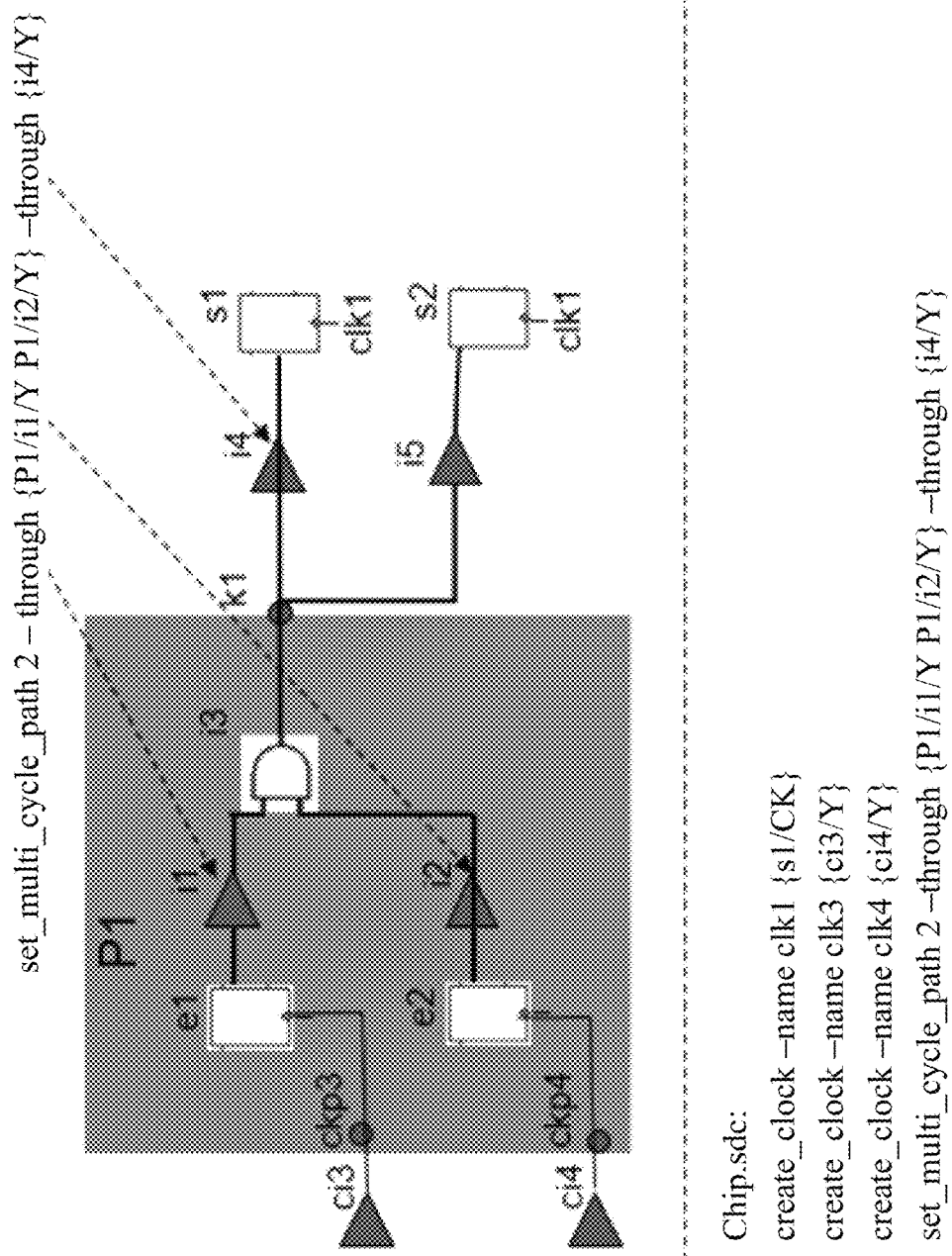
FIG. 9 illustrates a schematic showing yet another example chip design consistent with embodiments of the present disclosure.
Figure 10:
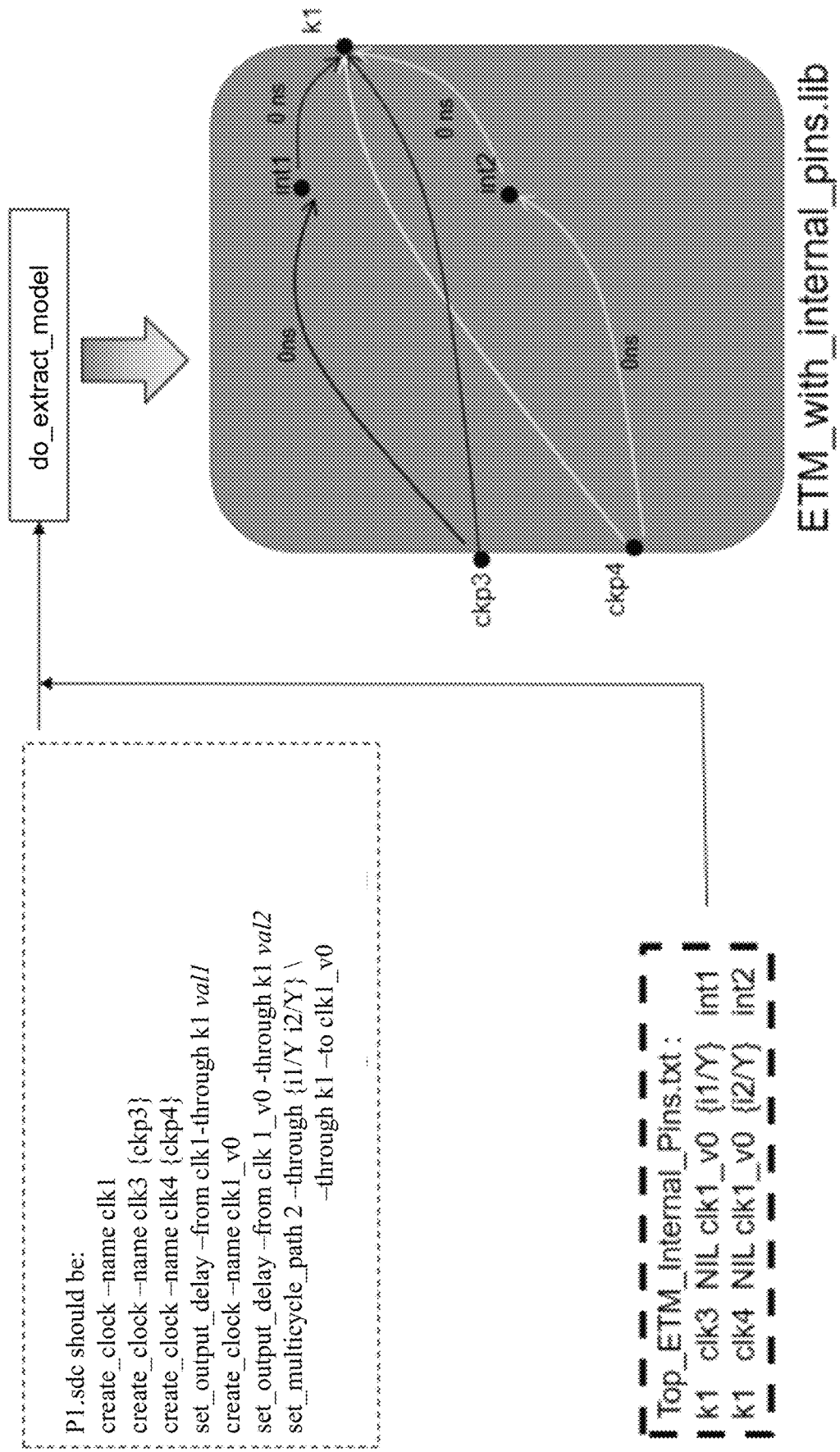
FIG. 10 illustrates a schematic showing an HPEC model for the example chip design of FIG. 9 consistent with embodiments of the present disclosure.

Referring now to FIGS. 9-10, an example chip design and corresponding HPEC model are provided. As shown in FIG. 9, an HPEC model for the sequential arcs in ETM, is provided. To model the hierarchy crossing path exception, additional sequential arcs may be created, which contains the internal pin reference of the pins defined in HCT.

Figure 11:
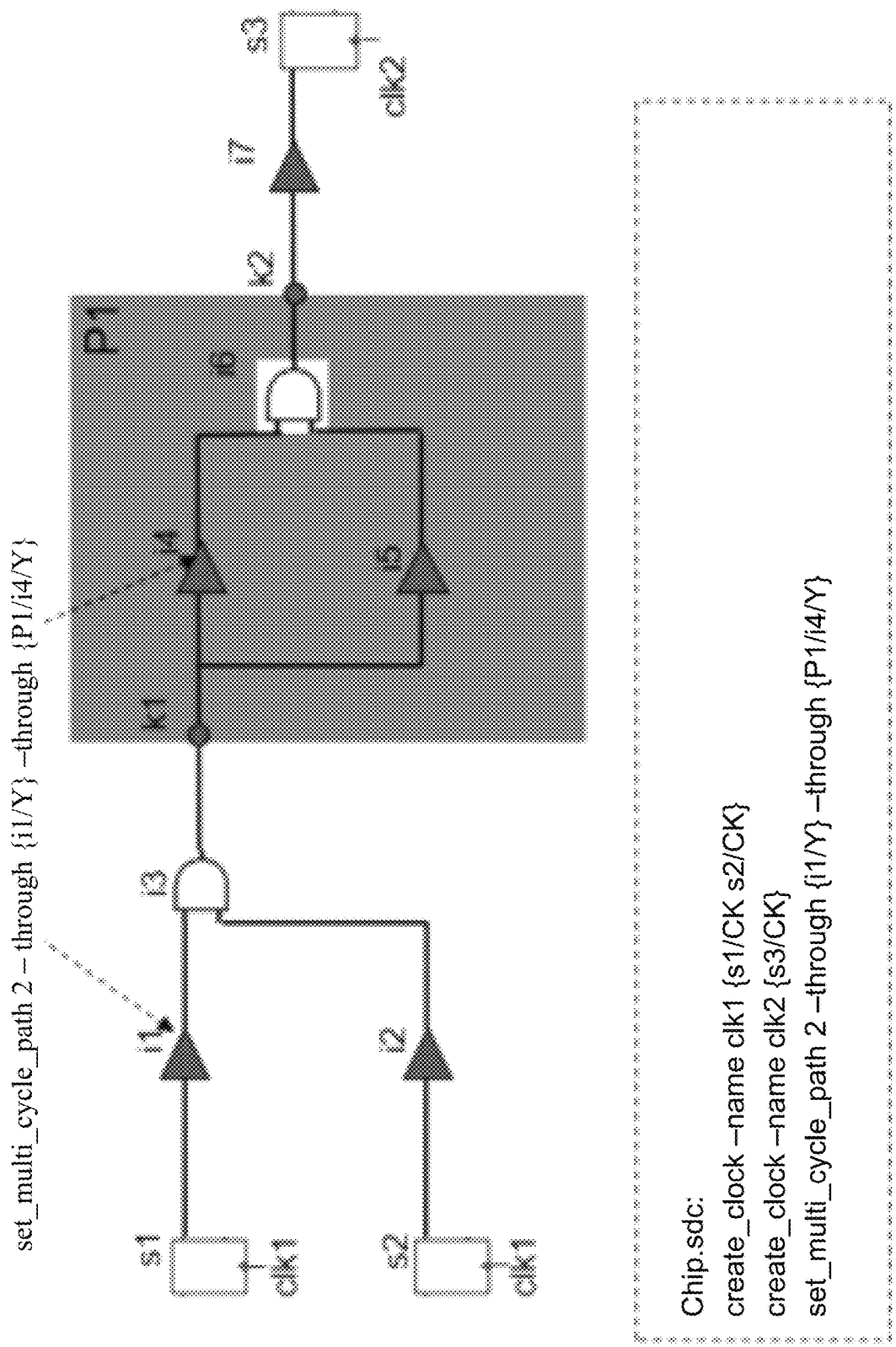
FIG. 11 illustrates a schematic showing yet another example chip design consistent with embodiments of the present disclosure.
Figure 12:
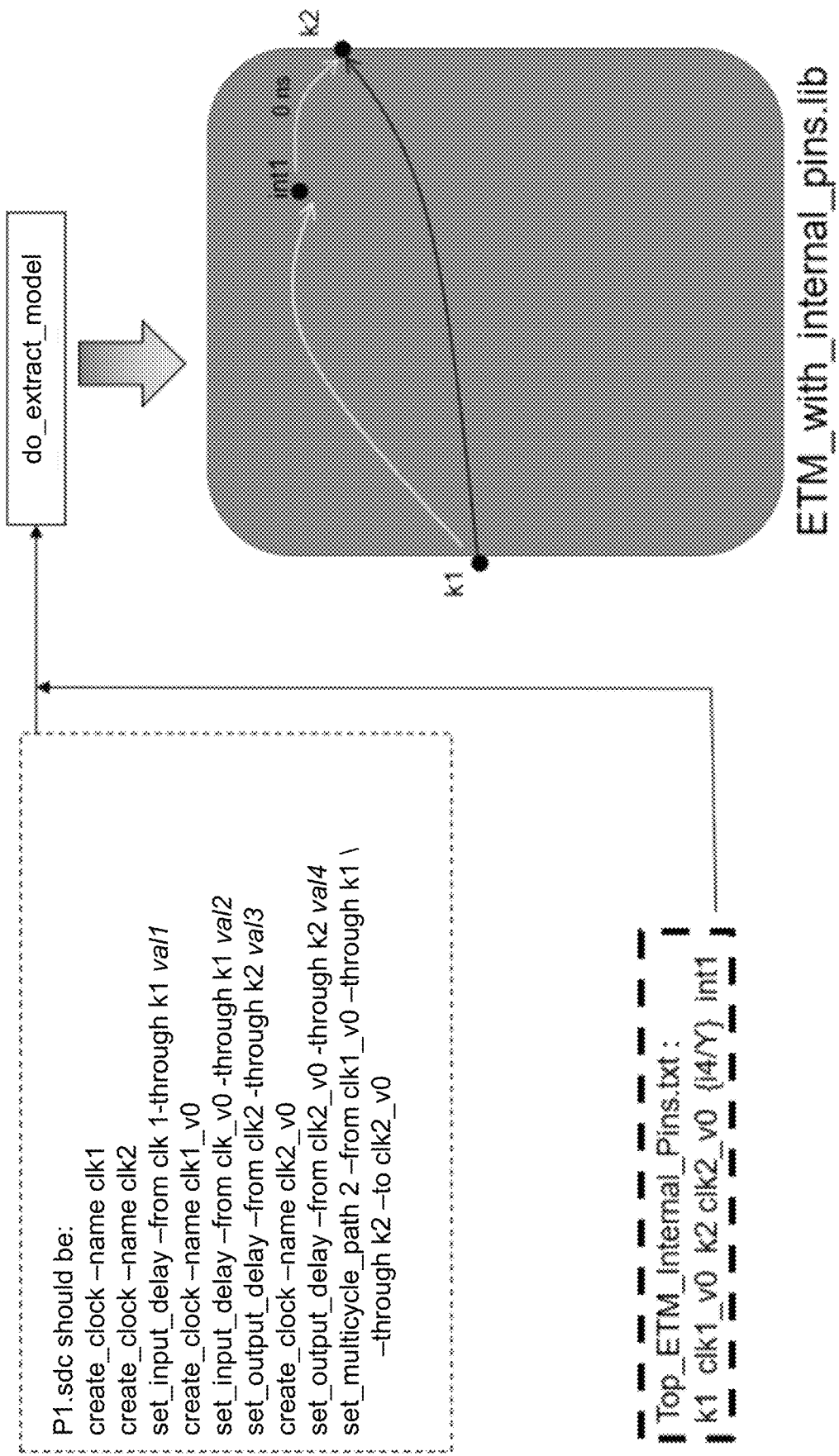
FIG. 12 illustrates a schematic showing an HPEC model for the example chip design of FIG. 11 consistent with embodiments of the present disclosure.

Referring now to FIGS. 11-12, an example chip design and corresponding HPEC model are provided. As shown in FIG. 11, an HPEC-ETM model of the combinational arc having hierarchy crossing path exceptions is provided. The internal pin in HCT may be used for in the arc reference.

Figure 13:
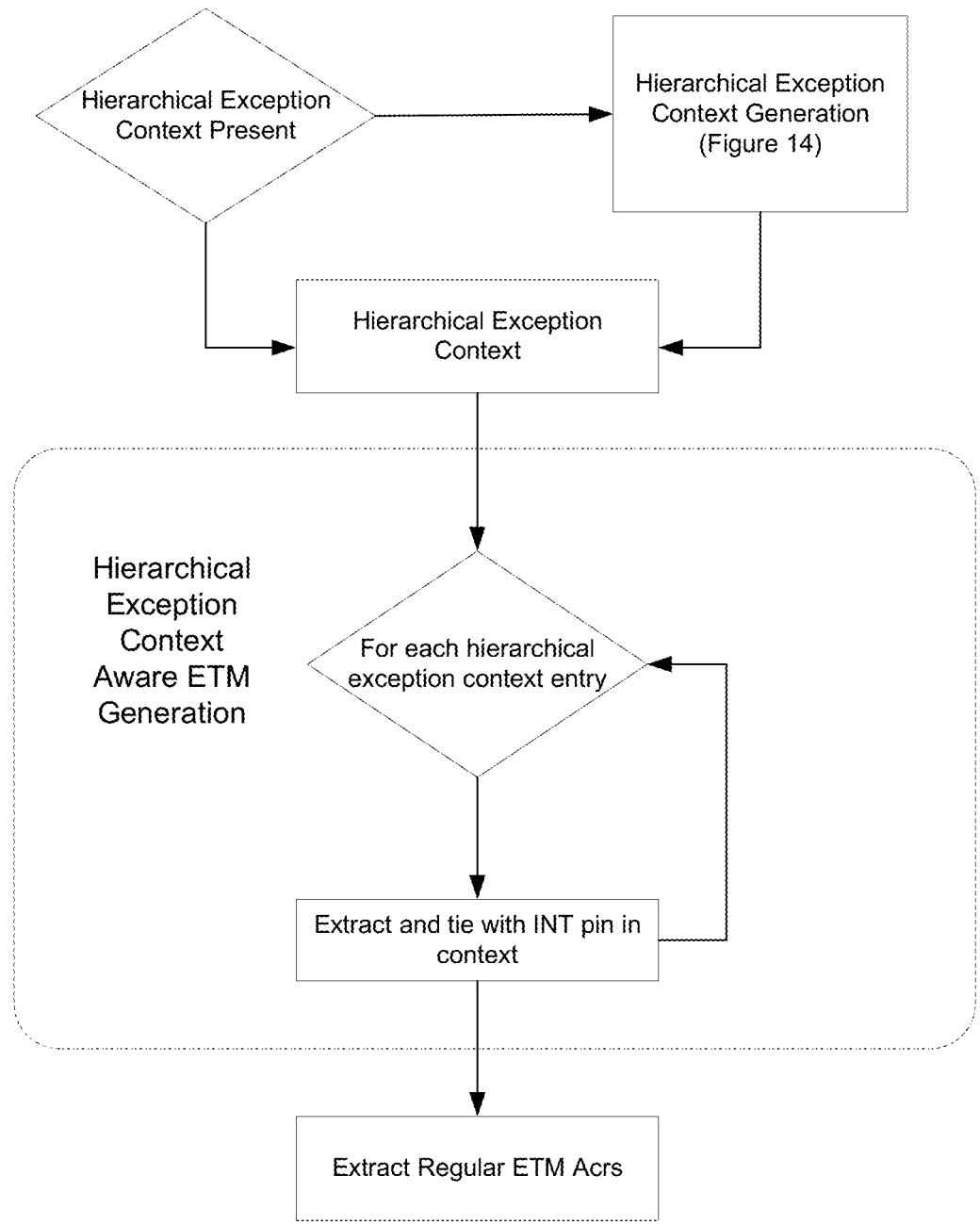
FIG. 13 illustrates a flowchart showing an example of hierarchical path exception context aware model extraction consistent with embodiments of the present disclosure.

Referring now to FIG. 13, a flowchart showing a number of operations for generating HPEC-ETMs is provided. Embodiments included herein provide multiple techniques for generating ETMs from an HPEC. One approach involves an automatic model extraction from the hierarchical design as shown in FIG. 15. An alternative approach involves the standalone generation of timing models in presence of the HTC as is provided in FIG. 13. In the presence of hierarchical exception context, the model extractor may be configured to extract one or more arcs for each HCT entry. The extracted arc may be tied with the internal pin name supplied through the context. These arcs combined with the original extracted model arcs, may constitute the hierarchical path exception aware ETM or HPEC-ETM model. In the absence of the HCT, the user may need the context generated, as is shown in FIG. 14.

Figure 14:
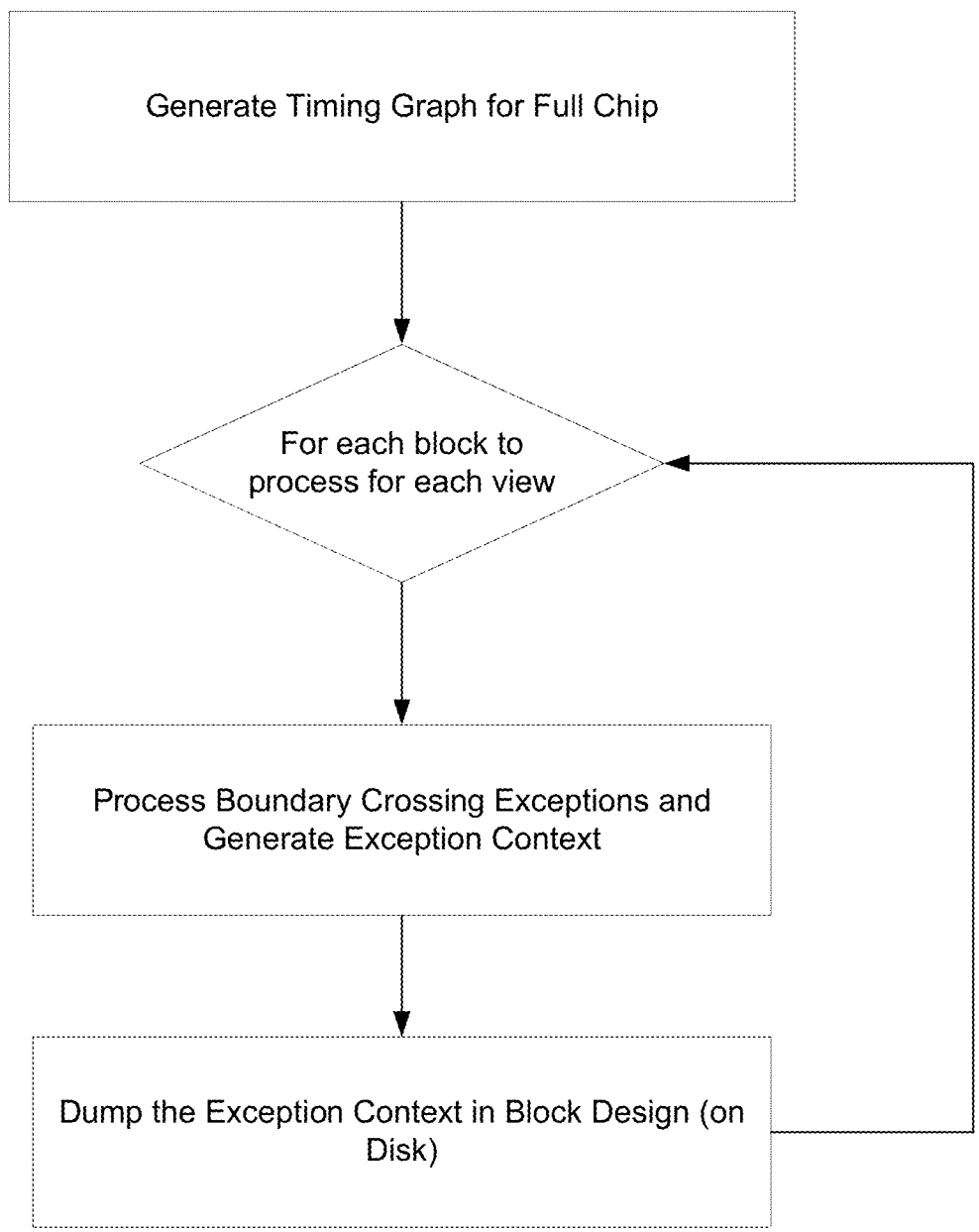
FIG. 14 illustrates a flowchart showing an example of hierarchical path exception context generation consistent with embodiments of the present disclosure.
Figure 15:
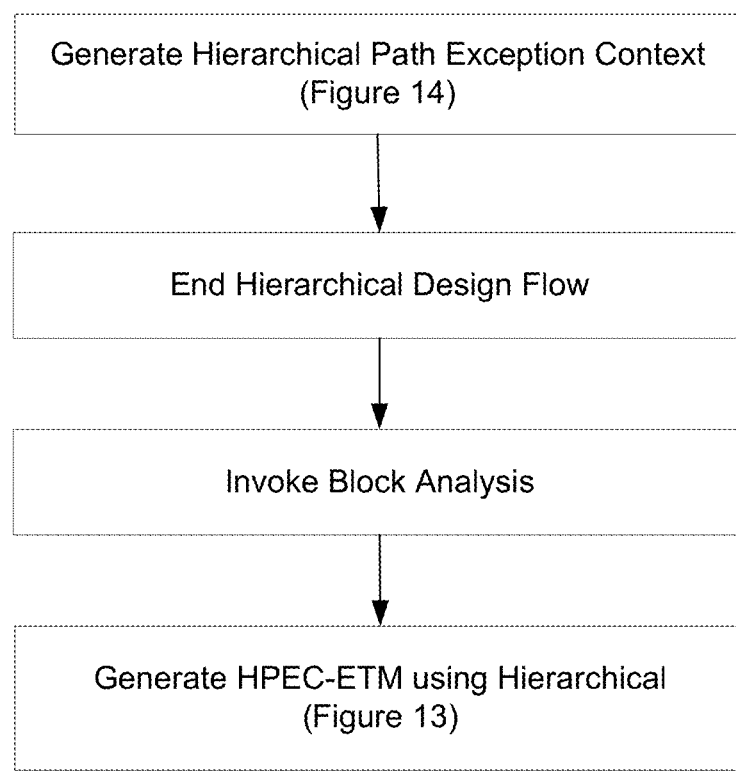
FIG. 15 illustrates a flowchart showing an example of automatic HPEC extracted timing model generation consistent with embodiments of the present disclosure.

Referring now to FIG. 14, a flowchart describing an example approach for generating the hierarchical exception generation is provided. The process for hierarchical context generation may include invoking a full chip view and subsequently processing the hierarchical boundary crossing exceptions. Embodiments included herein may be used in the time budgeting of hierarchical blocks for generating the hierarchical exception context, per view. Once the hierarchical context translator is generated, it may be reused for subsequent model extraction steps, as the exception points may not be changed across the block implementation steps.

Embodiments included herein are directed towards a novel modeling technique to encapsulate one or more hierarchy crossing path exceptions in a timing model. Extraction process 10 includes a new interface path modeling technique which addresses hierarchy crossing path exceptions. This allows resolving the loss of design intent and pessimism on the top level when the block ETM is stitched on the top level.

In some embodiments, extraction process 10 may include a translational information sharing model referred to herein as the Hierarchical Context Translator. This translator allows for capturing the hierarchy crossing path exception intent from hierarchical view to the block level view. HCT may be configured to maintain the structure of hierarchy crossing path exceptions intact, capturing the design intent.

In some embodiments, extraction process 10 may be configured to develop top level timing constraints in tandem with the HCT. Top level timing constraints being used on top level refers to the objects being written in HCT. This helps match the timing between the hierarchical view and the top-level view.

In some embodiments, extraction process 10 may allow for the HCT to be reusable across runs, which ensures that users may not need to recreate HCT. As such, once the HCT is generated it may be easily used across the top-level implementation runs. This makes it highly usable and very convenient for the users.

In some embodiments, extraction process 10 may allow for an automatic HPEC-ETM generation flow. This may be activated automatically, without user intervention, as the user may be unaware of the fact that the HPEC-ETM is being generated. The result may include the extracted timing model and top level SDC. In this example, the HPEC-ETM model may be generated from the hierarchical design view and the user remains unaware of the block view being invoked. The outcome of this flow is HPEC-ETM and top level SDC. Embodiments provide for a reduction in the pessimism of extracted timing models, due to additional coverage with path exception-based timing arcs.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result.

The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

When implemented as an apparatus for performing the operations described herein, the apparatus may be specially constructed for the required purposes, or it may comprise a general-purpose computer selectively activated or reconfigured by a computer program stored in the computer. Such a computer program may be stored in a computer readable storage medium, any type of storage media or device suitable for storing electronic instructions, and each coupled to a computer system bus.

The processes presented herein are not inherently related to any particular computer or other apparatus. Various general-purpose systems may be used with programs in accordance with the teachings herein, or it may prove convenient to construct a more specialized apparatus to perform the operations described.

When implemented in software, the elements of the embodiments of the invention are essentially the program, code segments, or instructions to perform the tasks. The program, code segments, or instructions can be stored in a processor readable medium or storage device that can be read and executed by a processor or other type of computing machine. The processor readable medium may include any storage medium or storage device that can store information in a form readable by a processor or other type of computing machine. The program or code segments may be downloaded via computer networks such as the Internet, Intranet, etc. and stored in the processor readable medium or storage device.

When implemented as a system, such as an electronic computer aided design (ECAD) system, the elements of the embodiments of the invention include one or more processors to execute the program, code segments, or instructions that may be stored in a processor readable medium or storage device to perform the tasks or functions of a method or process. The one or more processors may be specifically adapted to electronic computer aided design including processing logic that may comprise hardware (e.g., circuitry, dedicated logic, etc.), software, or a combination of both.

The embodiments of the invention are thus described. While embodiments of the invention have been particularly described, they should not be construed as limited by such embodiments. The embodiments of the invention should be construed according to the claims that follow below.

What is claimed is:

1. A computer-implemented method for performing static timing analysis in an electronic design comprising:
   providing, using at least one processor, an electronic design;
   extracting, using the at least one processor, hierarchical crossing path exception information from a hierarchical design view associated with a timing model of the electronic design, wherein the hierarchical crossing path exception information includes information associated with a path crossing a hierarchical boundary;
   transferring, using the at least one processor, the hierarchical crossing path exception information to a block view associated with the electronic design;
   extracting, using the at least one processor, the timing model based upon, at least in part, the hierarchical crossing path exception information, wherein the timing model is based upon, at least in part, a hierarchical context translator;
   implementing, using the at least one processor, the timing model at a top-level view associated with the electronic design;
   storing the hierarchical context translator; and
   reusing the hierarchical context translator during a second simulation.

2. The computer-implemented method of claim 1, further comprising:
   generating one or more top-level timing constraints based upon, at least in part, the hierarchical crossing path exception information.

3. The computer-implemented method of claim 2, further comprising:
   generating one or more block-level timing constraints, based upon, at least in part, the top-level timing constraints.

4. The computer-implemented method of claim 1, wherein the hierarchical crossing path exception information includes at least one crossing path exception that is initially visible at the hierarchical design view but not an initial top-level view.

5. The computer-implemented method of claim 1, wherein the timing model includes at least one of a check arc, a zero delay combination arc, and a sequential arc.

6. The computer-implemented method of claim 1, wherein the hierarchical context translator includes at least one of port information, internal pin information, and through list information.

7. A non-transitory computer-readable storage medium having stored thereon instructions that when executed by a machine result in the following operations:
   providing, using at least one processor, an electronic design;
   extracting hierarchical crossing path exception information from a hierarchical design view of a timing model of associated with the electronic design, wherein the hierarchical crossing path exception information includes information associated with a path crossing a hierarchical boundary;
   extracting a hierarchical context translator including port information and internal pin information from the hierarchical design view associated with the electronic design;
   transferring the hierarchical crossing path exception information to a block view associated with the electronic design;
   extracting the timing model based upon, at least in part, the hierarchical crossing path exception information and the hierarchical context translator;
   implementing the timing model at a top-level view associated with the electronic design, wherein the timing model includes one or more additional arcs for modelling at least one missing hierarchical boundary crossing exception associated with the hierarchical crossing path exception information;

storing the hierarchical context translator; and reusing the hierarchical context translator during a second simulation.

8. The computer-readable storage medium of claim 7, further comprising:

generating one or more top-level timing constraints based upon, at least in part, the hierarchical crossing path exception information.

9. The computer-readable storage medium of claim 8, further comprising:

generating one or more block-level timing constraints, based upon, at least in part, the top-level timing constraints.

10. The computer-readable storage medium of claim 7, wherein the hierarchical crossing path exception information includes at least one crossing path exception that is initially visible at the hierarchical design view but not an initial top-level view.

11. The computer-readable storage medium of claim 7, wherein the timing model includes at least one of a check arc, a zero delay combination arc, and a sequential arc.

12. The computer-readable storage medium of claim 7, wherein the hierarchical context translator includes through list information.

13. A system for performing static timing analysis in an electronic design comprising:

one or more processors configured to provide an electronic design and to extract hierarchical crossing path exception information from a hierarchical design view of a timing model of associated with the electronic design, wherein the hierarchical crossing path exception information includes information associated with a path crossing a hierarchical boundary, the one or more processors further configured to transfer the hierarchical crossing path exception information to a block view associated with the electronic design, the one or more processors being further configured to extract the timing model without user intervention based upon, at least in part, the hierarchical crossing path exception information, the one or more processors further configured to implement the timing model at a top-level view associated with the electronic design, wherein the timing model includes one or more additional arcs for modelling at least one missing hierarchical boundary crossing exception associated with the hierarchical crossing path exception information, wherein the one or more processors are further configured to extract and store a hierarchical context translator and reuse the hierarchical context translator during a second simulation.

14. The system of claim 13, wherein the one or more processors are further configured to extract a hierarchical context translator including port information and internal pin information from the hierarchical design view associated with the electronic design.

15. The system of claim 13, wherein the timing model includes at least one of a check arc, a zero delay combination arc, and a sequential arc.

16. The system of claim 14, wherein the hierarchical context translator includes at least one of port information, internal pin information, and through list information.

* * * * *